(12) United States Patent
Rihan et al.

(10) Patent No.: US 11,586,788 B2
(45) Date of Patent: Feb. 21, 2023

(54) EFFICIENT SHAPE-ACCURATE FINITE ELEMENT MESH VISUALIZATION

(71) Applicant: ANSYS, INC., Canonsburg, PA (US)

(72) Inventors: Jonathan Peter Rihan, Hunden (DE); Viralkumar Patel, Wantage (GB)

(73) Assignee: ANSYS, INC., Canonsburg, PA (US)

( * ) Notice: Subject to any disclaimer, the term of this patent is extended or adjusted under 35 U.S.C. 154(b) by 40 days.

(21) Appl. No.: 17/366,847

(22) Filed: Jul. 2, 2021

(65) Prior Publication Data
US 2023/0004695 A1     Jan. 5, 2023

(51) Int. Cl.
*G06F 30/23* (2020.01)
*G06T 15/00* (2011.01)
*G06F 111/10* (2020.01)

(52) U.S. Cl.
CPC ............ *G06F 30/23* (2020.01); *G06T 15/005* (2013.01); *G06F 2111/10* (2020.01); *G06T 2200/24* (2013.01)

(58) Field of Classification Search
CPC .... G06F 30/23; G06F 2111/10; G06T 15/005; G06T 2200/24
See application file for complete search history.

(56) References Cited

U.S. PATENT DOCUMENTS

| | | | | |
|---|---|---|---|---|
| 2008/0021679 A1* | 1/2008 | Bleiweiss | ............... | G06F 30/20 703/2 |
| 2016/0179998 A1* | 6/2016 | Gueguen | ............... | G06F 3/0484 703/1 |

OTHER PUBLICATIONS

ViZiR 4 (see https://pyamg.saclay.inria.fr/vizir4.html), Mesh and solution interactive visualization tool, ViZiR 4: User guide, Nov. 3, 2020, 64 pages.
Feuillet, R., Maunoury, M., and Loseille, A. (2021). On pixel-exact rendering for high-order mesh and solution. Journal of Computational Physics, 424:109860, 34 pages, (https://www.sciencedirect.com/science/article/pii/S0021999120306343).
Loseille, A. and Feuillet, R. (2018). Vizir: High-order mesh and solution visualization using OpenGL 4.0 graphic pipeline. In 2018 AIAA Aerospace Sciences Meeting, p. 1174 (https://arc.aiaa.org/doi/10.2514/6.2018-1174 ), 14 pages.

* cited by examiner

*Primary Examiner* — Michelle Chin
(74) *Attorney, Agent, or Firm* — Womble Bond Dickinson (US) LLP (57) ABSTRACT

In one embodiment, simulation systems and methods perform tessellation, on a GPU in a simulation system, of finite element method (FEM) elements in one or more simulated objects using physics solution data directly obtained by the GPU from the solver. In one embodiment, software compiled to run on the GPU can process the raw, native physics solution data to tessellate non-linear FEM elements without requiring preprocessing or ray tracing. In one embodiment, the tessellation can be performed on the fly based on a user's selected view of the simulated objects, and the selected view can be used to select a subset of the FEM elements and perform a tessellation on only the subset. In one embodiment, a level of tessellation can be dynamically determined based on the user's selected view.

20 Claims, 9 Drawing Sheets

EFFICIENT SHAPE-ACCURATE FINITE ELEMENT MESH VISUALIZATION

BACKGROUND

This disclosure relates to the field of computer simulations of physical objects during the design or evaluation of the objects, and more particularly relates to tessellation methods used in such simulations.

Such simulations typically involve the use of laws, models or principles in physics to analyze physical phenomena such as aerodynamic phenomena caused by an airplane wing's movement through air or thermal behavior of a smartphone that is used in a video conference call and is also exposed to the sun on a hot day during the call, etc. These simulations often use finite element methods (FEM) to compute physics based solutions to equations that describe the physical phenomena. The result of these computed solutions is often displayed on a display device that is coupled to the simulation system, and these computed solutions display data representative of the physics solution data on one or more meshes on the simulated objects. Often, different colors on the displayed mesh represent different physical values (e.g., red for hot temperatures and blue for colder temperatures, etc.). Conventional approaches to generating these meshes uses the central processing unit (CPU) of the simulation system to generate the physics solution data on linear or non-linear FEM elements on the object and then the CPU tessellates the FEM objects into planar 2D (two dimension) elements to create the final mesh. The CPU then provides the tessellated linear 2D mesh to a graphics processing unit (GPU) which can then generate pixel values within each tessellated linear element provided by the CPU, and the GPU will fill the frame buffer with these pixel values. This approach is required because GPUs support only linear (2D or 1D) primitives natively. An alternative approach, ViZiR 4 (see https://pyamg.saclay.inria.fr/vizir4.html), uses a preprocessing step to convert non-linear FEM elements into triangles and then the GPU is provided the resulting triangles. Also see the following publications: Feuillet, R., Maunoury, M., and Loseille, A. (2021). On pixel-exact rendering for high-order mesh and solution. Journal of Computational Physics, 424:109860 (https://www.sciencedirect.com/science/article/pii/S00210991203); and Loseille, A. and Feuillet, R. (2018). Vizir: High-order mesh and solution visualization using OpenGL 4.0 graphic pipeline. In 2018 AIAA Aerospace Sciences Meeting, page 1174 (https://arc.aiaa.org/doi/10.2514/6.2018-1174). These prior approaches tend to require too much computational resources to generate an intermediate result mesh from the physics data to display the physics solution data on a mesh on a display.

SUMMARY OF THE DESCRIPTION

In one embodiment, simulation systems and methods perform tessellation, on a GPU in a simulation system, of finite element method (FEM) elements in one or more simulated objects using physics solution data directly obtained by the GPU from the solver. In one embodiment, software compiled to run on the GPU can process the raw, native physics solution data to tessellate non-linear FEM elements without requiring preprocessing or ray tracing. In one embodiment, the tessellation can be performed on the fly based on a user's selected view of the simulated objects, and the selected view can be used to select a subset of the FEM elements and perform a tessellation on only the subset. In one embodiment, a level of tessellation can be dynamically determined (on the GPU, for each element) based on the user's selected view. The tessellation level can, for example in one embodiment, be dynamically selected (on the GPU) for each element at the time it is rendered on the GPU during the execution of a tessellation control program; this can allow different elements to have completely different tessellation levels based on their size in the view.

In one embodiment, a simulation system can perform a method that includes the following operations: receiving, at a graphics processing unit (GPU), physics solution data from a physics solver in a simulation system that is simulating one or more physical objects, the physics solution data providing solution data, at one or both of nodes or element identifiers, in an initial set of three dimension (3D) linear or non-linear finite element method (FEM) elements; determining, in the simulation system, a view dynamically selected by a user, the view to show physics solution data on the simulated one or more objects on a display coupled to the simulation system; selecting FEM elements, from the initial set of FEM elements, to be tessellated based on the view selected by the user; selecting one or more tessellation shaders based on types of the FEM elements in the view selected by the user; tessellating, on the GPU, each selected FEM element into a plurality of two-dimension (2D) or one-dimension (1D) tessellation elements; interpolating, on the GPU, physics solution data within each 2D or 1D tessellation element to generate pixel values representing the physics solution data; and displaying, on a display device coupled to the simulation system, the generated pixel values in the view selected by the user.

In one embodiment, the GPU selects the FEM elements to be tessellated based on, and limited to, the view selected by the user so that FEM elements entirely outside of that selected view will not be tessellated by the GPU. In one embodiment, the physics solution data can include all of the FEM elements (an initial set of FEM elements) in the objects in the simulation, and the selected view limits the selected FEM elements to a subset of the initial set.

In one embodiment, the tessellating of each FEM element is performed on the GPU by a tessellation shader software program that is selected based on a type of each FEM element, and the selected tessellation shader tessellates an FEM element using an element shape function that corresponds to the type of the FEM element. In one embodiment, the software compiled for execution on the GPU can include the tessellation shaders expected to be used for the different types of FEM elements that will be found in simulations performed on a simulation system. In one embodiment, each type of FEM element can have a particular type of tessellation shader designed to tessellate the corresponding type of FEM element; for example, a first tessellation shader is designed to tessellate a first type of FEM element (e.g., for non-linear 2D triangle faces of non-linear tetrahedrons) while a second tessellation shader is designed to tessellate a second type of FEM element (e.g., for non-linear 2D quadrilateral faces of non-linear hexahedrons), etc., and each tessellation shader program operates on only its corresponding FEM element that has the same type. The types of linear and non-linear FEM elements can include: tetrahedrons, pyramids, prisms, and other three dimension (3D) volumes, triangles and quads in two dimensions (2D), and lines in one dimension (1D), and the types of each 2D tessellation element can include a 2D triangle, and each 1D tessellation element can be a line. In one embodiment as described further below, a subset of 3D FEM elements in a selected view are determined based on the selected view, and then the simulation system extracts 2D and 1D FEM elements embedded in this subset of 3D FEM elements, and this extracted set of 2D and 1D FEM elements is then tessellated, by the appropriate tessellation shader, so that each extracted 2D FEM element is tessellated into a set of 2D triangles (e.g., many 2D triangles) and each extracted 1D FEM element is tessellated into a set of 1D linear lines (e.g., many 1D lines).

In one embodiment, the method can further include the operation of: computing, on the GPU, surface normal vectors for each 2D tessellation element by computing spatial derivatives at the nodes of the associated (linear or nonlinear) 2D FEM element (after any displacement has been applied) using the 2D FEM element shape function to construct normal vectors at its nodes and then using the 2D FEM shape function to interpolate the normal vectors using the shape function of the 2D FEM element to generate interpolated normals at the vertices of the 2D tessellation elements. These surface normal vectors can be used when the object in the simulation is deformed to compute the current deformation on the GPU in one embodiment.

In one embodiment, the method can further include the operation of: determining a level of tessellation based on an estimated size of screen coverage by one or more selected FEM elements. In one embodiment, the tessellation level increases as estimated size of screen coverage increases, causing more tessellation elements to be created during the tessellation. A high tessellation level means there will be more tessellation elements created than a low tessellation level; generally, higher magnification on objects displayed in the simulation will produce higher levels of tessellation than a lower magnification on the objects.

In one embodiment, the simulation system comprises a host central processing unit (CPU), which comprises one or more processing cores, that is coupled to the GPU, which also comprises one or more processing cores, and wherein a host application, executing on the CPU, receives user input to control management of execution of the physics solver to produce the physics solution data. This user input can include one or more of: inputting of CAD data files that describe the one or more objects in the simulation; selection of parameters in a physics solver to cause the physics solver to operate in a particular fashion, etc. In one embodiment, the physics solver is used directly by the GPU to tessellate the selected FEM elements without prior transformation or preprocessing of the physics solution data.

In one embodiment, a tessellation evaluation shader can generate interpolated physics solution data (within each 2D tessellated element) at the same time as position data, and this data can then be directly used in a fragment shader. In one embodiment, GPU compute shaders can write to GPU buffers that are used to draw relevant subsets to reduce GPU overhead. In one embodiment, volume element data (e.g., the initial set of FEM elements) can be stored on GPU memory and then a subset of this data can be dynamically used, based upon a user's selected view, to extract and tessellate 2D elements.

The embodiments herein improve the operation of the simulation system by allowing for faster computations of the relevant data on GPUs and by avoiding preprocessing operations on the CPU and by freeing up the CPU for other operations.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods and such a data processing system can be considered a simulation system.

The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
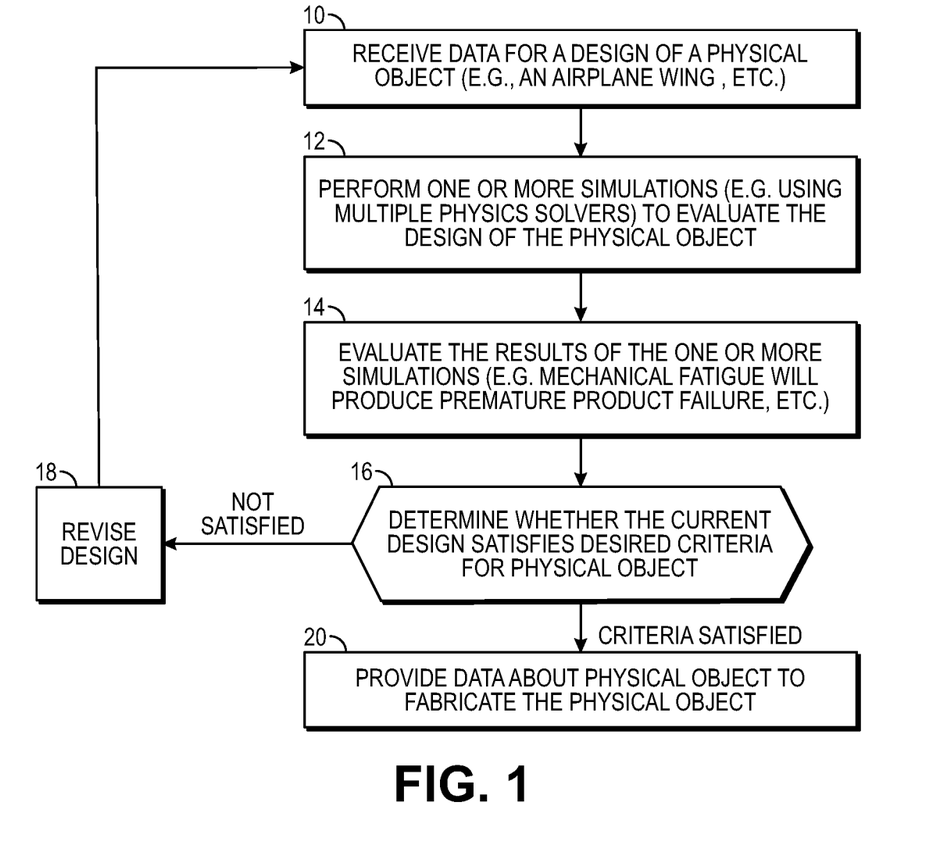
FIG. 1 is a flowchart which illustrates a method which can be used according to one or more embodiments described herein to design or evaluate a product using a simulation system.

The embodiments described herein can be used in computer simulations of various different physical systems and physical objects (for example, an aircraft's wing or a blade in a turbine) in order to determine whether a particular design of the system or object satisfies particular requirements for the system or object. For example, there might be certain design requirements relating to aerodynamic properties and physical strength of an aircraft's wing, and one physics simulation or several multiphysics simulations can be used to determine whether a particular design satisfies those design requirements. FIG. 1 shows a method in which these design requirements can be tested relative to a particular design of a system or object which is being simulated. In operation 10 of FIG. 1, a data processing system (e.g., a computer executing simulation software to provide a simulation system) can receive data about a design for a system or object. The data can be created in computer aided design (CAD) software on a data processing system, and the data can include geometry information (e.g., sizes and shapes) about the system or object, material information about the material(s) that will be used to manufacture the system or object, and information about external forces and an environment surrounding the system or object (e.g., wind speed, temperatures, etc.). Then in operation 12, the data processing system can perform one or more physics simulations or multiphysics simulations (such as simulations using different physics solvers over different spaces in the simulations) to evaluate the design of the system or object. These physics simulations can provide physics solution data that can use the aspects and embodiments described herein. In operation 14, the designer can evaluate the results of one or more simulations to determine whether the design of the system or object satisfies certain desired criteria for the design. This determination is shown in operation 16. If the one or more criteria are satisfied, then the designer in operation 20 can provide data about the system or object to allow the fabrication or manufacture of the system or object. For example, if the one or more criteria are satisfied, a CAD file can be produced that describes how to build the system or object, and the system or object can be manufactured based on that CAD file. If the criteria are not satisfied as determined in operation 16, the designer can revise the design in operation 18 (for example, by changing sizes and/or materials used in the system or object, etc.) and repeat the process by performing additional further simulations to evaluate the redesigned system or object. This can be repeated until the desired criteria are achieved for the system or object.

Figure 2A:
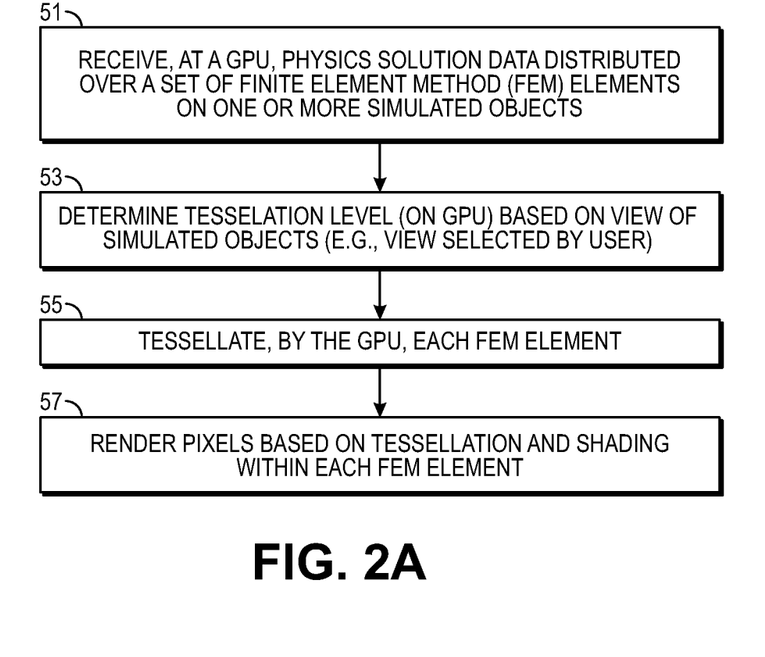
FIG. 2A is a flowchart that shows a general example according to one embodiment of a method to tessellate one or more simulated objects that are simulated in a simulation system.
Figure 2B:
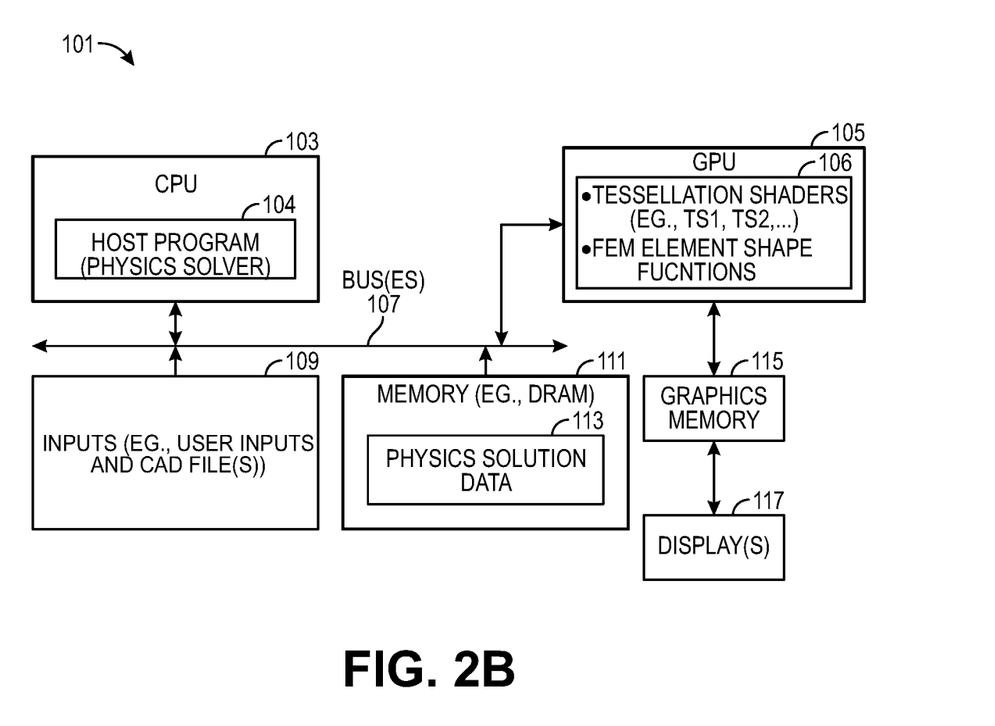
FIG. 2B is a block diagram that shows a simulation system according to one embodiment.
Figure 2C:
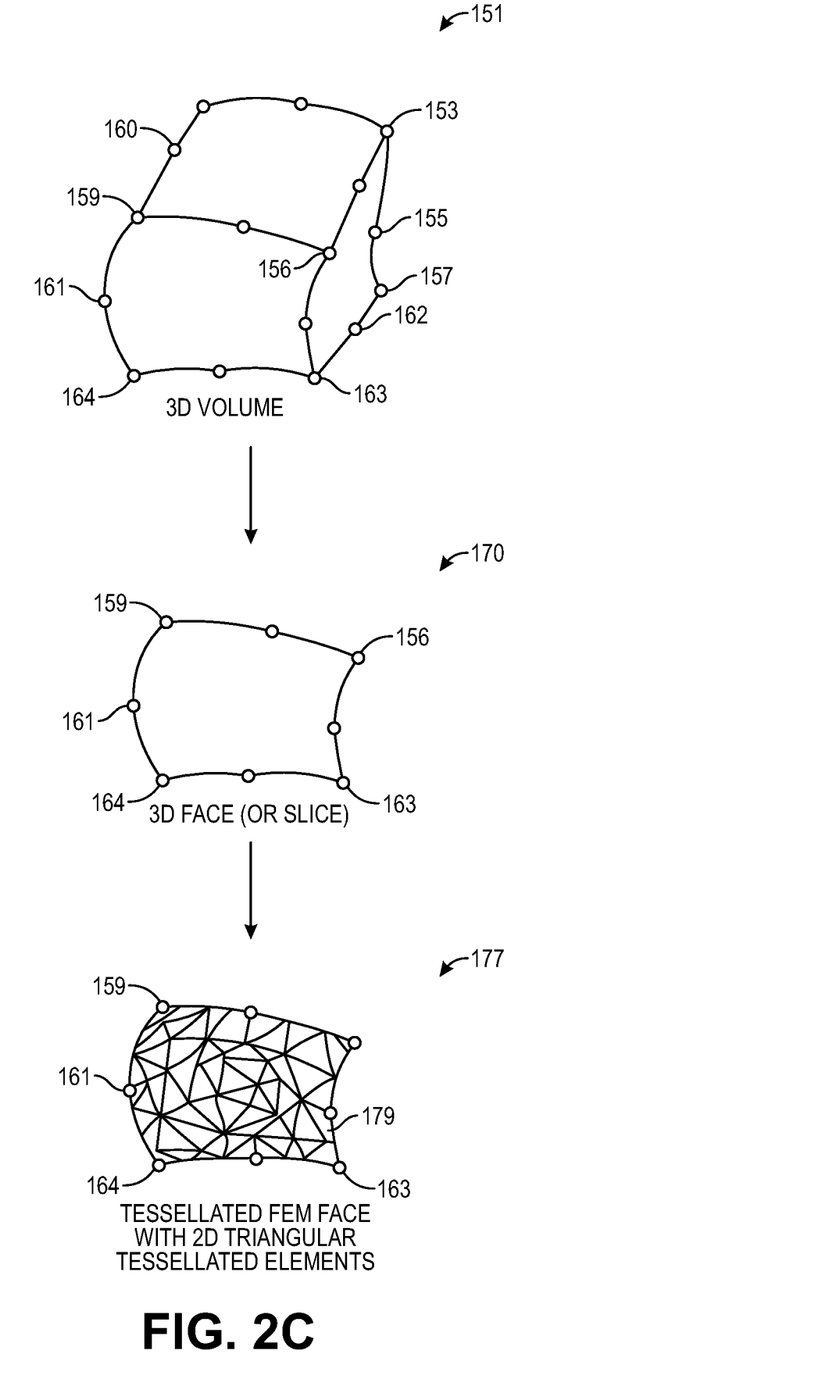
FIG. 2C shows a sequence of how a simulated object is simulated and ultimately tessellated according to one embodiment.
Figure 5A:
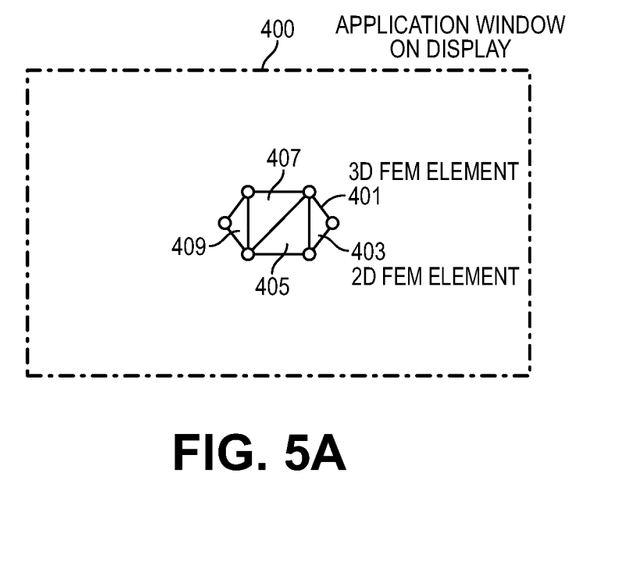
FIGS. 5A and 5B show examples of different levels of tessellation based upon estimated size of screen coverage of an FEM element.
Figure 5B:
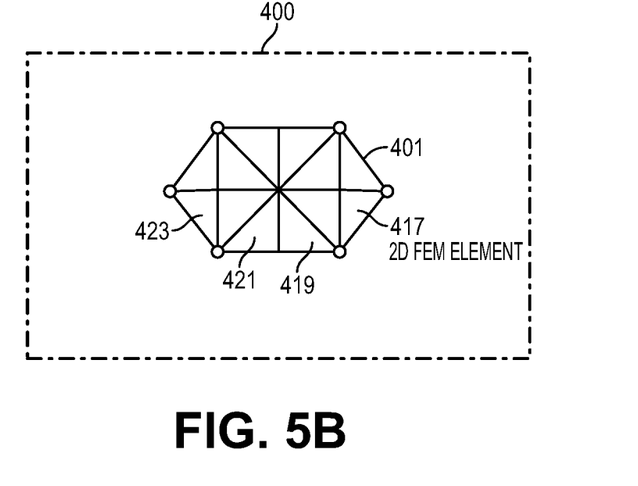
Figure 6:
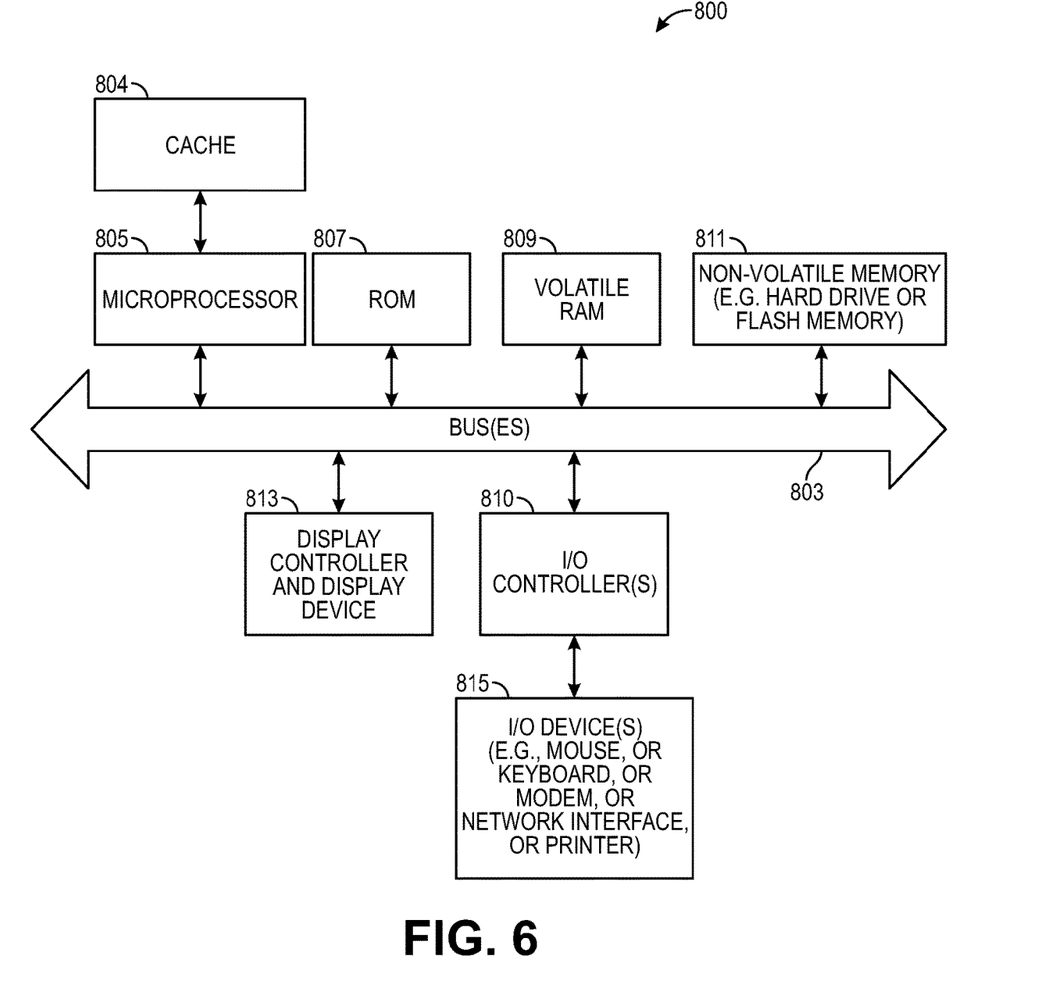
FIG. 6 shows an example of a data processing system that can perform one or more of the methods described herein and also be used to implement a simulation system that can perform one or more embodiments described herein.

A method according to one embodiment is shown in FIG. 2A; this method can be implemented in the system shown in FIG. 2B or in the system shown in FIG. 6. In operation 51 in FIG. 2A, a GPU in a simulation system (e.g., GPU 105 in simulation system 101 in FIG. 2B) can receive native or raw physics solution data that is distributed over 3D FEM elements on the geometry of one or more objects being simulated in the simulation. The native or raw physics solution data can be physics solution data directly output by one or more physics solvers that are being used in the simulation. No preprocessing of 3D FEM elements prior to receipt by the GPU is required in one embodiment. In operation 53, the GPU (e.g., GPU 105) can determine a tessellation level based on a view of the one or more simulated objects; FIGS. 5A and 5B shows examples of two views (with FIG. 5B showing a view of the simulated object, within the application's window, that has a higher magnification than the view of the same simulated object shown in FIG. 5A). In operation 55, the GPU (e.g., GPU 105) can then tessellate each 3D FEM element into a set of 2D and 1D tessellated elements; this tessellation can use tessellation shaders that are dedicated for use with the appropriate type of FEM element as further described below. In operation 57, the GPU (e.g., GPU 105) can then render pixels based on the tessellation and cause the image with the rendered pixels to be displayed on a display device that is coupled to the simulation system. FIG. 2C shows the results of the sequence of operations in the method shown in FIG. 2A.

The 3D volume 151 in FIG. 2C represents a simulated object for which one or more physics solvers have generated physics solution data; as is known in the art, the physics solvers typically generate this data at nodes on a set of 3D FEM elements, such as nodes 153, 155, 156, 157, 159, 160, 161, 162, 163, and 164 shown in FIG. 2C. For example, if the physics solver is attempting to compute thermal levels at the nodes, the nodes include temperature data as solution results from the physics solver. After a user (or the system) selects a particular view of the simulated one or more objects, a portion 170 of the 3D volume is determined and used to extract 3D FEM elements from the portion based on the selected view. In the example shown in FIG. 2C, the portion can be a 3D face portion of the 3D volume (e.g., the surface of a structure in the simulated object, such as the surface of a blade in a turbine), and this portion can contain a plurality of 3D, 2D and 1DFEM elements. Then, the portion is tessellated to convert the 3D, 2D and 1D FEM elements in the portion into a set of 2D and 1D tessellated elements, such as tessellated element 179 shown in the tessellated 3D element 177. The tessellated element 179 can be a 2D triangle that can be shaded by a fragment shader as described herein.

An example of a simulation system 101 that can perform the methods described herein is shown in FIG. 2B. The simulation system 101 includes a central processing unit (CPU) 103 and a graphics processing unit (GPU) 105 that are coupled by one or more buses 107 as is known in the art. The CPU 103 and the GPU 105 are also coupled, through the one or more buses 107, to main memory 111 (e.g., DRAM) and to non-volatile memory (such as one or more hard drives or flash memory, as is known in the art, to store the simulation software and data files for the objects being designed in persistent storage). In addition, the CPU 103 and GPU 105 are also coupled to one or more input/output controllers 109 to receive inputs such as user inputs (via a mouse, touchscreen, etc.) and files relating to the simulated one or more objects (e.g., computer aided design (CAD) files). The GPU 105 is coupled to graphics memory 115 which can store graphics data used in the tessellation and shading processes and also store pixel data in a frame buffer which is coupled to one or more displays 117, although in some embodiments, the frame buffer may be in separate memory (e.g., VRAM).

In one embodiment, the simulation system 101 includes simulation software that includes a host program 104 that generates a user interface of the simulation system and receives user inputs to control and operate the simulation software (e.g., the user can, after inputting data, instruct the simulation system to perform a simulation using one or more physics solvers). This simulation software (e.g., simulation software that includes host program 104) can include one or more physics solvers as is known in the art, and in one embodiment, the physics solvers can execute at least in part on the CPU 103 (and in some embodiments, the GPU may be used as a co-processor with the CPU to perform calculations for the physics solver(s)). The generated results from these one or more physics solvers can be stored in memory 111 as physics solution data 113; in one embodiment, the stored physics solution data 113 is the native, raw output from the one or more physics solvers (e.g., physics solvers in host program 104) with physics solution data at nodes (or elements or nodes and elements) of a set of 3D FEM elements in the one or more objects being simulated, such as an airplane's wing or a turbine), and this native raw output physics solution data is used directly (without any preprocessing that converts 3D FEM elements into linear 2D and 1D tessellation elements) by the GPU 105 in, for example, the methods shown in FIG. 2A or 3 or 4A-4D.

The GPU 105 can execute simulation software designed to execute on the GPU 105, such as software 106 that can include a set of tessellation shaders (e.g., TS1, TS2, etc.) and related functions such as FEM element shape functions to process the physics solution data 113. Each tessellation shader in one embodiment is designed to operate on a single type of FEM element; for example, a first tessellation shader (e.g., TS1) operates on a first type of 2D FEM element (e.g., non-linear triangle) and a second tessellation shader (e.g., TS2) operates on a second type of 2D FEM element (e.g., non-linear quadrilaterals). In the example shown in FIGS. 4A, 4B, 4C, and 4D, this software 106 can include software that implements the operations shown in box 251 (in FIG. 4A), box 253 (in FIG. 4B), box 255 (in FIG. 4D) and box 257 (in FIG. 4D), and the GPU can also execute conventional graphics software, such as software based on OpenGL. In one embodiment, the software 106 can perform all of the operations shown in each of the methods in FIG. 2A or FIG. 3 or FIGS. 4A-4D. Furthermore, this software 106 can be part of and originate from the simulation software that also includes the host program 104.

Figure 3:
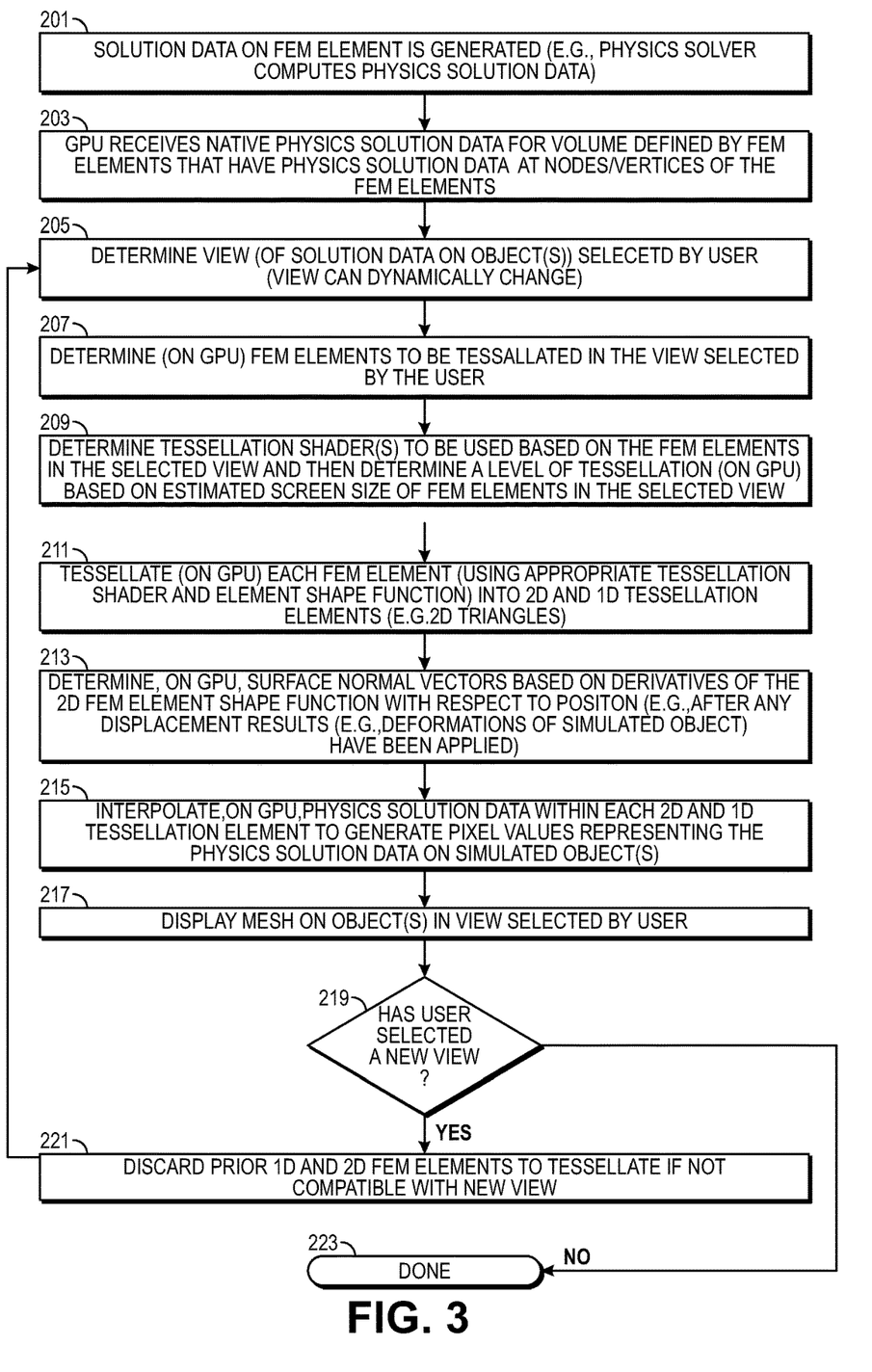
FIG. 3 is a flowchart that shows another example of a method according to an embodiment.

A more detailed example of an embodiment is shown in FIG. 3 which shows a method that can be performed entirely on a GPU (e.g., GPU 105) in a simulation system (e.g., simulation system 101). In operation 201 in FIG. 3, physics solution data (e.g., physics solution data 113) is generated, and in operation 203 the GPU receives the native physics solution data for a volume of the one or more objects being simulated, where the 3D volume is defined by an initial set of 3D FEM elements that have physics solution data (e.g., at the nodes of each of the 3D FEM elements or in each 3D FEM element). Typically, the nodes are vertices of each of the 3D FEM elements. In operation 205, the simulation system determines the view selected by the user (or the simulation system if a default view is used when the user does not select a view). This view can be selected using an input device such as a mouse or touchpad or touchscreen using user interface techniques that are known in the art. The view can be determined by a plane that is controlled by the input device, and the plane can define the selected view; the plane can represent a viewing plane on the simulated objects, such that a user can view all physics solution data on the objects on and below the plane or viewing position. For example, portions of the object above the plane or viewing position would not be in the selected view. A change in magnification at the same viewing plane is not a change in view, and a change in "camera" orientation of the same viewing plane is also not a change in view. This selected view in one embodiment can dynamically change; for example, the user can move a cursor, controlled by a mouse, around over the displayed one or more objects in the application's window (e.g., application window 400 in FIGS. 5A and 5B) to select different views over time, and each time the selected view is used in operation 207 to determine (on the GPU in one embodiment) the subset of FEM elements to be tessellated based on the selected view.

Then in operation 209, the CPU can determine which tessellation shaders to use for the 3D FEM elements in the selected view based upon the 3D FEM elements that are in the selected view via the 2D or 1D FEM element portions derived from them; in one embodiment, the GPU can execute a set of tessellation shaders (e.g., as shown in FIG. 2B), each of which is designed to operate on its corresponding type of 2D or 1D FEM element. The GPU may use only a subset of those tessellation shaders if the selected view has only a subset of the corresponding 2D or 1D FEM elements (and thus, not all 3D FEM elements (via their derived 2D FEM element or 1D FEM element portions) in the simulated object(s) will be tessellated). Then, in one embodiment, each of the tessellation shaders determines, in operation 209, on the GPU, a level of tessellation based on an estimated screen size of FEM elements in the selected view. FIGS. 5A and 5B show examples of a window in the simulation software displayed on a display device coupled to the simulation system that executes the simulation software. As shown in FIGS. 5A and 5B, the user has selected two different levels of zoom or magnification of the one or more simulated objects displayed by the simulation system within an application window 400 produced the by the simulation software on the simulation system. In FIG. 5A, the simulation system displays a 3D FEM element 401 at a first level of magnification, and (based on that level of magnification) the tessellation shaders on the GPU select/determine a first level of tessellation that produces (as shown in FIG. 5A) four tessellation elements which include tessellation element 403 which is a linear 2D tessellation element (a planar 2D triangle). In FIG. 5B, the simulation system displays a 3D FEM element 401 at a second level of magnification, and (based on that level of magnification) the tessellation shaders on the GPU select/determine a second level of tessellation for the faces of the 3D FEM element (here two 2D FEM triangles and one 2D FEM quadrilateral element, that make up the portion being displayed) hat produces (as shown in FIG. 5B) twelve tessellation elements which include tessellation elements 417, 419, 421, and 423, each of which is a linear 2D tessellation element (a planar 2D triangle). In this embodiment, a higher magnification in the selected view produces more tessellated elements than a lower magnification. In one embodiment, this determination of the level of tessellation is performed on the GPU by the set of tessellation shaders in operation 209, and each tessellation shader can determine the tessellation level of each 2D or 1D FEM element that it is tessellating based upon the FEM elements in the selected view (e.g., based one or more FEM elements of the same corresponding type as the tessellation shader). For example, each tessellation shader, for each individual 2D or 1D FEM element that it is tessellating, can use the estimated screen coverage size of the 2D or 1D FEM element in the selected view to determine a tessellation level for each 2D or 1D FEM elements individually.

Then in operation 211, the GPU can tessellate each 2D or 1D FEM element (extracted from a 3D FEM element as described below with reference to FIG. 4B) into a set of 2D and 1D FEM elements using the appropriate tessellation shader for the 2D or 1D FEM element portions extracted from the 3D FEM element (based upon a match between the type of FEM element and the corresponding tessellation shader). Each tessellation shader uses its corresponding element shape function to tessellate the 2D or 1D FEM element into linear 2D (and 1D) tessellation elements. For example, a tessellation shader designed to operate on a quadrilateral can use an element shape function for a quadrilateral to tessellate the quadrilateral into a set of linear 2D triangle tessellation elements.

In operation 213, the simulation system can optionally compute, on the GPU (e.g., GPU 105), surface normal vectors based on derivatives of the 2D FEM element shape functions with respect to position over the surface of the 2D element; this can be done after displacements on the one or more objects in the simulation such as deformations of the simulated object have been applied (e.g., a load is applied to the simulated object and the load deforms the object).

In operation 215, the simulation system can interpolate (on the GPU) physics solution data based on the 2D FEM element, and interpolated data for each vertex is used by each 2D and 1D tessellation element to generate pixel values representing the physics solution data on the one or more simulated objects; this interpolation can be a linear interpolation or an interpolation based on the 2D FEM element shape function for the tessellated object. Then the simulation system can display, in operation 217, the one or more simulated objects with the generated pixel values on a display device coupled to the simulation system. For example, if the simulated object is a smartphone and the physics solution data includes temperatures, operation 217 can display the simulated one or more objects (e.g., a circuit board within the smartphone) with the different temperatures over different parts of the surface of the smartphone (e.g., red pixels for hot temperatures and blue pixels for cooler temperatures). The method shown in FIG. 3 can repeat each time the user selects a different view (new view plane selected) as determined in operation 219; if the no new view plane is selected then the process is completed 223. A change in viewing position occurs when the user changes the viewing plane (but does not occur when there is merely a change in magnification or when there is merely a change in "camera" position (e.g., a rotation of the view at the same viewing plane). On the other hand, if operation 219 determines the user has selected a different viewing plane (such as a different slice of the 3D object that is deeper into the object), then processing proceeds to operation 221 to determine which 1D and 2D FEM elements to discard and then processing returns to operation 205. In operation 221, the simulation system discards previously determined 2D and 1D FEM elements that make up the display portion of the 3D FEM elements, if they are not compatible with the new view. For example, if the new view is deeper into the object, then prior 2D and 1D FEM elements that made up the portions of the 3D FEM elements that are entirely above the viewing plane are discarded as they will not be needed; thus the nodes for prior 2D and 1D FEM elements that make up the prior display portion can be discarded.

Figure 4A:
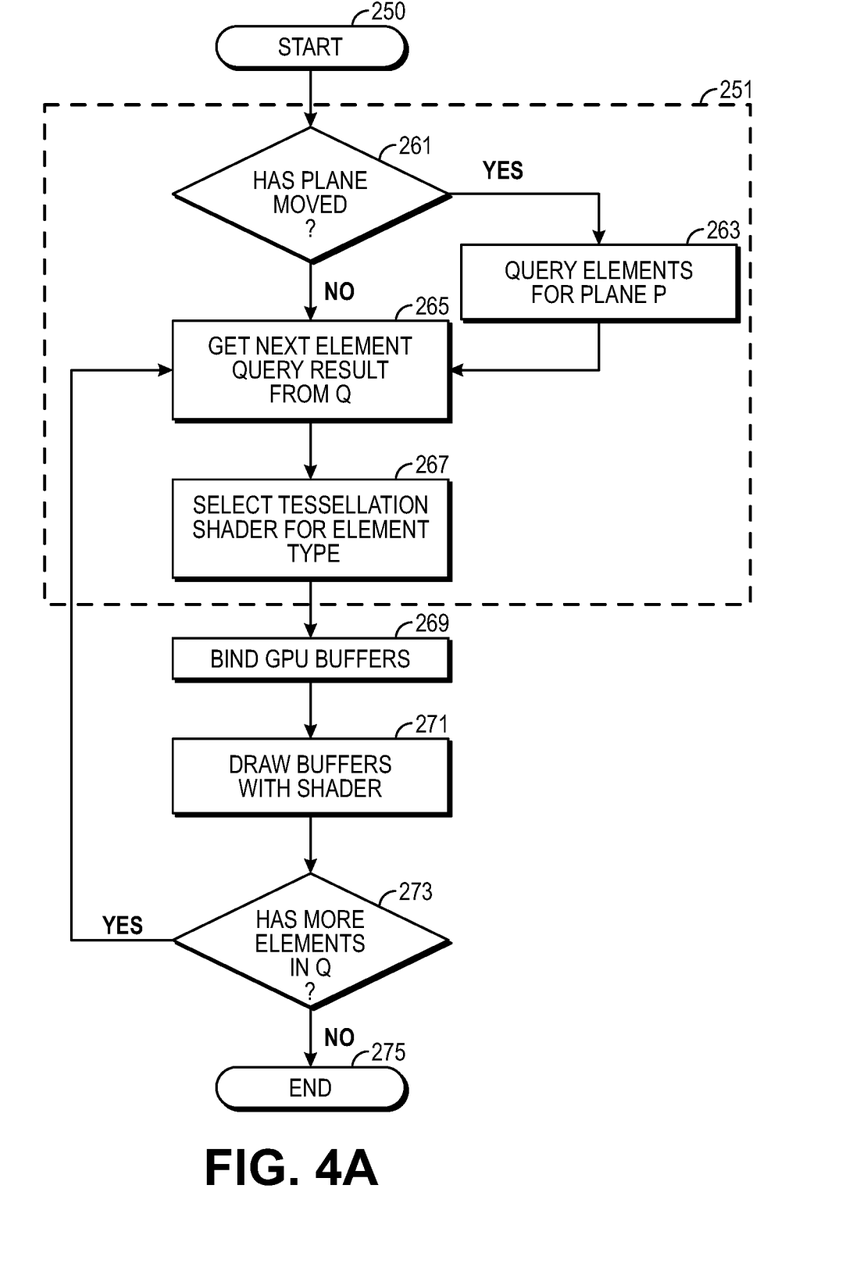
FIGS. 4A, 4B, 4C, and 4D are flowcharts that shows another example of a method according to an embodiment.

A more detailed method according to one embodiment will now be described while referring to FIGS. 4A, 4B, 4C and 4D. FIG. 4A shows a main loop of this method, FIG. 4B shows a subroutine that is called from the main loop to extract the relevant data for the 3D FEM elements when the viewing plane changes, FIG. 4C shows a method, called from the main loop, that prepares the GPU to perform a draw command, and FIG. 4D shows the method that is performed when the GPU performs a draw command, called from the method in FIG. 4C, using the tessellation shaders described herein. In one embodiment, software designed to execute on the GPU is compiled to run on the GPU to perform many of the operations shown in FIGS. 4A, 4B, 4C and 4D; for example, the operations in blocks 251, 253, 255, and 257 can be performed by such software and can be part of the simulation software (e.g., simulation software that includes host program 104 in FIG. 2B).

Referring now to FIG. 4A, the method can start 250 when a user decides to show physics solution data on the one or more simulated objects on the display of the simulation system. This can be after the simulation system successfully computes physics solution data and reports to the user that the computations were successful and have been completed; the user can then request the system to display the physics solution data. The system determines in operation 261 whether a viewing plane has moved; at initial start up the viewing plane may have a default position or the system may request the user to select a viewing plane. Whenever the system determines that the viewing plane has changed, processing returns to start 250 and then to operation 263 which leads to the method shown in FIG. 4B.

Figure 4B:
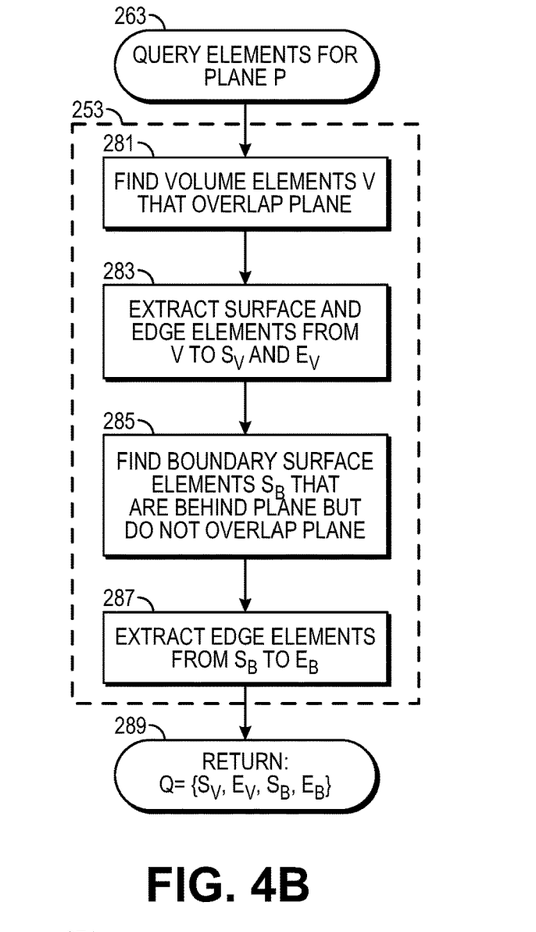
Figure 4C:
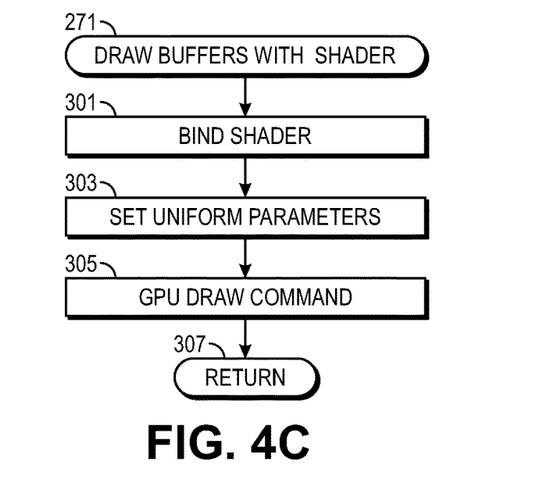
Figure 4D:
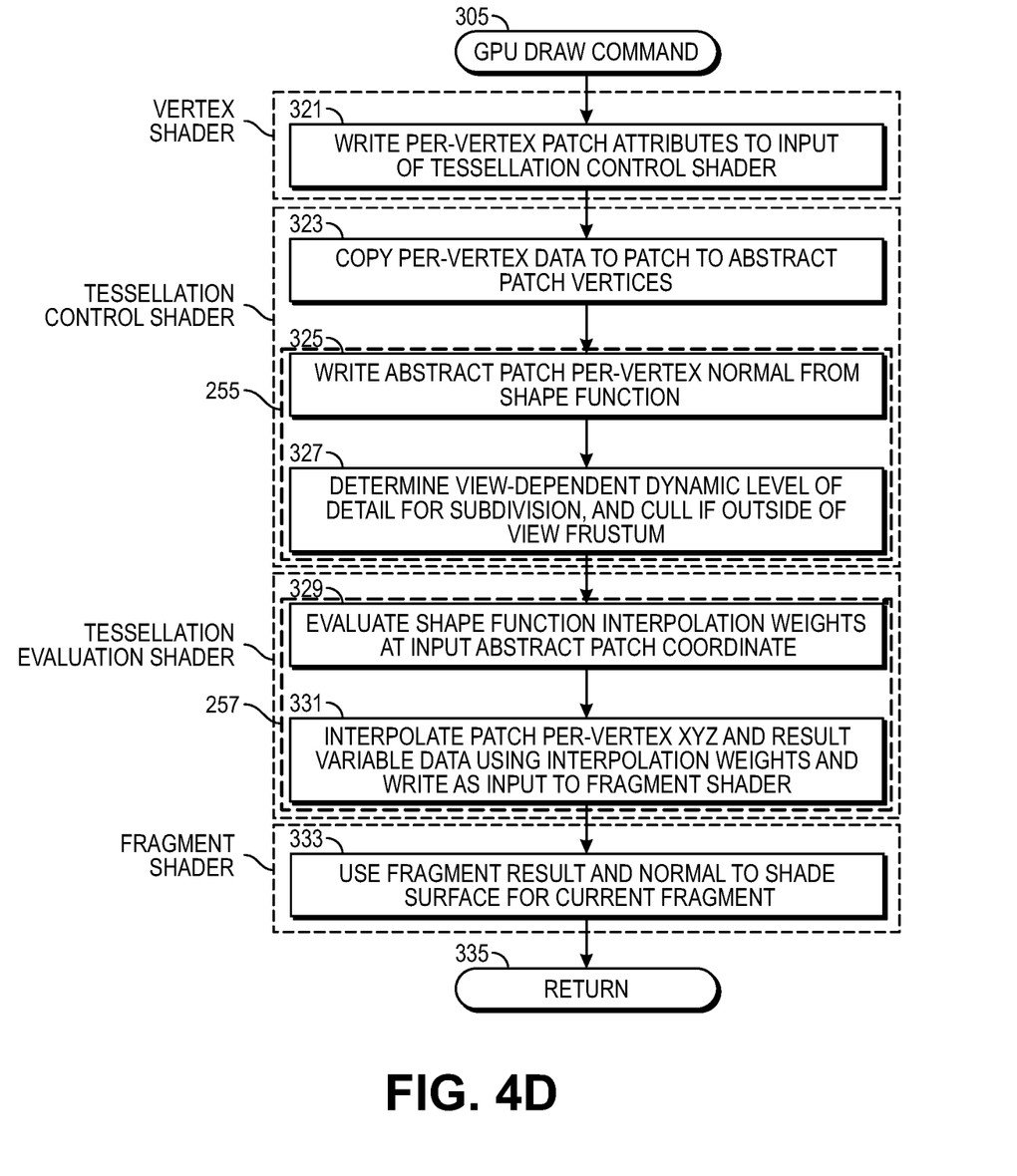

FIG. 4B shows the process of extracting the relevant 3D FEM elements from the current viewing plane; this process uses volume element data stored on the GPU in one embodiment and relevant selection criteria such as the user's viewing plane (also referred to as section plane) and includes operations 281, 283, 285, and 287 shown in FIG. 4B. The result 289 of these operations is a set of data Q ($Q=(S_V, E_V, S_B, E_B)$) that represents the extracted relevant 2D and 3D FEM elements from the currently selected view. In one embodiment, these processes can use, as an input, a subset of the volume elements marked as being on the outermost spatial boundary (e.g., any volume element that has no opposing/connected element on one or more of its faces). These processes can exploit the fact that for a 3D FEM element, the faces of the 3D FEM element are equivalent to 2D FEM elements, and the edges of the 3D element are equivalent to 1D FEM elements. In one embodiment, for each volume element that passes the selection criteria, the method in FIG. 4B extracts only the 2D FEM face element indices of the relevant 3D volume elements and extracts the 1D FEM edge element indices of extracted 2D FEM face elements. These 2D and 1D face indices refer to data in the volume physics data, such as position, physics variables (physics solution data) etc. This has the following desirable properties: the 1D and 2D FEM element faces refer to data as close as possible to the original data space, and the 1D and 2D FEM element faces can be extracted on demand, such that data remains in it most compact form (3D FEM element) until 1D and 2D FEM elements are actually needed for display. These features improve the operation of the simulation system by making it use less memory and perform only the needed extractions rather than the preprocessing operations in the prior art which use more memory and compute unnecessary operations that are not needed for a current view.

After the method in FIG. 4B returns the results 289 (the set of data Q) or if the viewing plane has not changed, the system (as shown in FIG. 4A) proceeds to operation 265 to obtain the next extracted result for a 3D FEM element and then determines in operation 267 the appropriate tessellation shader for the element type. This selection of the tessellation shader has been described above. Each tessellation shader is dedicated for use on a predetermined type of 2D or 1D FEM element, and operation 267 selects the tessellation shader that has a type that matches the type of the current FEM element picked in operation 265. Operations 269 and 271 then invoke the drawing operations which lead to the methods in FIGS. 4C and 4D (described further below), which then return back to operation 473. In operation 473, the system determines whether there are more elements in Q that require tessellation and if so, then processing returns to operation 265 and repeats; if there are no further elements in Q that require tessellation, then the process ends 275.

The drawing operations begin in the method shown in FIG. 4C and are completed in the method shown in FIG. 4D. These operations use the 1D and 2D FEM elements that have been extracted (by the method in FIG. 4B) from the relevant 3D FEM elements. Operation 271 in FIG. 4A calls or invokes the method in FIG. 4C which includes operations 301, 303, and 305. Operation 305 in FIG. 4C calls or invokes the method in FIG. 4D which includes operations 323, 325, 327, 329, 331, and 333. The final result from operation 333 are the shaded fragments that are then combined with the framebuffer pixels for display, the shaded fragments were generated from the 2D triangles and 1D lines that were created by the tessellation shader, where the 2D and 1D tessellation elements created during tessellation reside solely on the GPU and are discarded once the shaded fragments have been generated for them, and this result causes processing to return to operation 273 in FIG. 4A. In one embodiment, the operation 321 can be performed by a vertex shader, and operations 323, 325 and 327 can be performed by a tessellation control shader using portions of the simulation software that includes host program 104 (in FIG. 2B). In one embodiment, the operations 329 and 331 can be performed by a tessellation evaluation shader that also uses portions of the simulation software that includes host program 104. In one embodiment, operation 333 can be performed by a fragment shader. As explained above, each of the tessellation shaders are specialized for their corresponding/matching 1D or 2D FEM element type. Each of these tessellation shaders can determine surface normal vectors at the 2D FEM element nodes using derivatives of the 2D element shape function; this means storage (memory usage) is not required, since this data is generated on demand in the tessellation shader on the GPU. When a deformation (e.g., a load) is applied to the physics result (e.g., load applied to the simulated object having the physics solution data), the surface normal can be generated dynamically based on the current deformation (which can be applied on the GPU), without needing to maintain and update separate surface normal vector data buffers. The feature improves the operation of the simulation system relative to prior art approaches. In one embodiment, the tessellation shader in operation 327 dynamically determines the one or more levels of tessellation based on the estimated 1D or 2D FEM element size in the currently selected view (for example, as shown in FIGS. 5A and 5B), where in the 2D FEM element case the outer tessellation level for each edge of the 2D FEM element is determined by the size of that edge in the currently selected view (this helps avoid gaps between independent tessellations of adjacent 2D FEM elements that share an edge in the view) and the inner tessellation level of the interior of the 2D FEM element is determined based on the size of the whole 2D FEM element in the view, and the 1D FEM element case the tessellation detail along the length of the 1D FEM element is determined based on the size of the 1D FEM element in the selected view. The tessellation shaders in operations 329 and 333 determine, on the GPU, interpolated values at tessellation coordinates, and these interpolated values can include position, physics variables (physics solution data), and surface normal vector. In one embodiment, the tessellation data exists only to generate pixel values (on the GPU) and does not persist after the tessellation shader invocation completes.

In one embodiment, no additional GPU buffers are required to store intermediate interpolated tessellation data between draw calls, and the tessellation data for a draw call and tessellation shader invocation exists for only the duration of that draw call (and the draw call ends/returns at return 335).

FIG. 6 shows one example of a data processing system 800, which may be used with one embodiment. For example, the system 800 may be implemented to provide a system or device that performs any one of the methods described herein. Thus, the system 800 is an example of a simulation system, and the system 800 can execute the simulation software described herein. Note that while FIG. 6 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 6, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 6 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable computer program instructions which when executed by a data processing system cause the data processing system to perform a machine implemented method, the method comprising:
   receiving, at a graphics processing unit (GPU), physics solution data from a physics solver in a simulation system that is simulating one or more physical objects, the physics solution data providing solution data, at one or both of nodes or element identifiers, in an initial set of finite element method (FEM) elements;
   determining, in the simulation system, a view dynamically selected by a user, the view to show physics solution data on the simulated one or more objects on a display coupled to the simulation system;
   selecting FEM elements, from the initial set of FEM elements, to be tessellated based on the view selected by the user;
   selecting one or more tessellation shaders based on types of the FEM elements in the view selected by the user;
   tessellating, on the GPU, each selected FEM element into a plurality of two-dimension (2D) or one-dimension (1D) tessellation elements;
   interpolating, on the GPU, physics solution data within each 2D or 1D tessellation element to generate pixel values representing the physics solution data; and
   displaying the generated pixel values in the view selected by the user.

2. The medium as in claim 1, wherein the GPU selects the FEM elements to be tessellated based on, and limited to, the view selected by the user.

3. The medium as in claim 1, wherein the tessellating of each FEM element is performed on the GPU by a tessellation shader software program that is selected based on a type of each FEM element, and the selected tessellation shader tessellates an FEM element using an element shape function that corresponds to the type of the FEM element.

4. The medium as in claim 1, wherein the method further comprises:
   computing, on the GPU, surface normal vectors for each 2D or 1D tessellation element by computing derivatives of element shape functions of the 2D or 1D tessellation elements.

5. The medium as in claim 1, wherein the method further comprises:
   determining, on the GPU, one or more levels of tessellation, for each selected FEM element, based on an estimated size of screen coverage of the FEM element itself and any outer edges that make up that FEM element.

6. The medium as in claim 5, wherein tessellation level increases as estimated size of screen coverage increases, causing more tessellation elements to be created during the tessellation.

7. The medium as in claim 1, wherein the simulation system comprises a host central processing unit (CPU), which comprises one or more processing cores, that is coupled to the GPU, which also comprises one or more processing cores, and wherein a host application, executing on the CPU, receives user input to control management of execution of the physics solver to produce the physics solution data.

8. The medium as in claim 7, wherein the physics solution data from the physics solver is used directly by the GPU to tessellate the selected FEM elements without prior transformation or preprocessing of the physics solution data.

9. The medium as in claim 1, wherein types of FEM elements comprise: tetrahedrons, pyramids, prisms, and other 3D volumes, where each 3D FEM element can be linear or non-linear, and wherein each 2D tessellation element is a 2D triangle and each 1D tessellation element is a line.

10. The medium as in claim 1, wherein the view selected by the user limits the selected FEM elements to a subset of the initial set of FEM elements.

11. A machine implemented method, the method comprising:
   receiving, at a graphics processing unit (GPU), physics solution data from a physics solver in a simulation system that is simulating one or more physical objects, the physics solution data providing solution data, at one or both of nodes or element identifiers, in an initial set of finite element method (FEM) elements;
   determining, in the simulation system, a view dynamically selected by a user, the view to show physics solution data on the simulated one or more objects on a display coupled to the simulation system;
   selecting FEM elements, from the initial set of FEM elements, to be tessellated based on the view selected by the user;
   selecting one or more tessellation shaders based on types of the FEM elements in the view selected by the user;
   tessellating, on the GPU, each selected FEM element into a plurality of two-dimension (2D) or one-dimension (1D) tessellation elements;
   interpolating, on the GPU, physics solution data within each 2D or 1D tessellation element to generate pixel values representing the physics solution data; and
   displaying the generated pixel values in the view selected by the user.

12. The method as in claim 11, wherein the GPU selects the FEM elements to be tessellated based on, and limited to, the view selected by the user.

13. The method as in claim 11, wherein the tessellating of each FEM element is performed on the GPU by a tessellation shader software program that is selected based on a type of each FEM element, and the selected tessellation shader tessellates an FEM element using an element shape function that corresponds to the type of the FEM element.

14. The method as in claim 11, wherein the method further comprises:
   computing, on the GPU, surface normal vectors for each 2D or 1D tessellation element by computing derivatives of element shape functions of the 2D or 1D tessellation elements.

15. The method as in claim 11, wherein the method further comprises:
   determining one or more levels of tessellation, on the GPU, for each selected FEM element, based on an estimated size of screen coverage of the FEM element itself and of any outer edges that make up that FEM element.

16. The method as in claim 15, wherein tessellation level increases as estimated size of screen coverage increases, causing more tessellation elements to be created during the tessellation.

17. The method as in claim 11, wherein the simulation system comprises a host central processing unit (CPU), which comprises one or more processing cores, that is coupled to the GPU, which also comprises one or more processing cores, and wherein a host application, executing on the CPU, receives user input to control management of execution of the physics solver to produce the physics solution data.

18. The method as in claim 17, wherein the physics solution data from the physics solver is used directly by the GPU to tessellate the selected FEM elements without prior transformation or preprocessing of the physics solution data.

19. The method as in claim 11, wherein types of FEM elements comprise: tetrahedrons, pyramids, prisms, and other 3D volumes, where each 3D FEM element is either linear or non-linear, and wherein each 2D tessellation element is a 2D triangle and each 1D tessellation element is a line.

20. The method as in claim 11, wherein the view selected by the user limits the selected FEM elements to a subset of the initial set of FEM elements.

* * * * *